(12) United States Patent
Nakajima et al.

(10) Patent No.: US 6,330,037 B1
(45) Date of Patent: Dec. 11, 2001

(54) PICTURE SIGNAL PROCESSING METHOD FOR PROCESSING A PICTURE SIGNAL CONTAINING INFORMATION INCLUDING MAIN PICTURE PORTION AND NON-PICTURE PORTIONS

(75) Inventors: Masahiro Nakajima; Hiroshi Otaki, both of Yamanashi-ken (JP)

(73) Assignees: Pioneer Corporation, Tokyo; Pioneer Video Corporation, Yamanashi-ken, both of (JP)

( * ) Notice: Subject to any disclaimer, the term of this patent is extended or adjusted under 35 U.S.C. 154(b) by 0 days.

(21) Appl. No.: 09/440,135

(22) Filed: Nov. 15, 1999

(30) Foreign Application Priority Data

Nov. 27, 1998 (JP) .................................................. 10-337147

(51) Int. Cl.[7] .............................. H04N 5/21; H04N 7/015
(52) U.S. Cl. ......................... 348/607; 348/620; 348/448; 348/625; 348/913
(58) Field of Search .................................... 348/607, 625, 348/913, 618, 619, 620, 621, 624, 445, 448, 449, 452, 451; H04N 5/21, 7/01, 7/015

(56) References Cited

U.S. PATENT DOCUMENTS

| 5,534,935 | * | 7/1996 | Kawai | ................................... | 348/448 |
| 6,262,773 | * | 7/2001 | Westerman | ........................... | 348/448 |

* cited by examiner

*Primary Examiner*—Sherrie Hsia
(74) *Attorney, Agent, or Firm*—Arent Fox Kintner Plotkin & Kahn PLLC

(57) ABSTRACT

A picture signal processing method is provided for processing a picture signal containing information including main picture portion and non-picture portions. This method comprises: detecting boundary portions existing between the main picture portion and the non-picture portions of the picture signal; performing inter-field interpolation treatment to produce an interpolation scanning signal; and using the interpolation scanning signal to perform inter-field interpolation treatment on boundary portions between the main picture portion and the non-picture portions of the picture signal, so as to ensure a clearly visible display of the boundary portions.

2 Claims, 5 Drawing Sheets

UPPER BOUNDARY PORTION L1
UPPER NON-PICTURE PORTION B1
MAIN PICTURE PORTION A
LOWER NON-PICTURE PORTION B2
LOWER BOUNDARY PORTION L2

PICTURE SIGNAL PROCESSING METHOD FOR PROCESSING A PICTURE SIGNAL CONTAINING INFORMATION INCLUDING MAIN PICTURE PORTION AND NON-PICTURE PORTIONS

BACKGROUND OF THE INVENTION

The present invention relates to picture signal processing method.

A display apparatus is provided with a displaying screen having a predetermined aspect ratio. On the other hand, there has been in practical use a system for displaying a letter-box type picture in the display apparatus, which system is capable of displaying a picture having another aspect ratio different from the above predetermined aspect ratio.

For example, according to NTSC (National Television system committee) standard system, there has been in use a television receiver which has a display screen having an aspect ratio of 4:3. In order that such a television receiver may be used to display a wide Picture having an aspect ratio of 16:9 which is just the same as that of a motion picture, a kind of letter-box type picture signal has been used in the television broadcast.

When using the letter-box type picture signal, as shown in FIG. 8, the display screen of a television receiver having an aspect ratio of 4:3 is allowed to display a picture which is comprised of i) a main picture portion A having an aspect ratio of 4:(9/4) corresponding to an aspect ratio of 16:9, ii) two non-picture portions B1, B2 each having an aspect ratio of 4:(3/8). In detail, a wide picture may be displayed on the main picture portion A, while the non-picture portions B1 and B2 are made black without showing any picture. In this manner, although the whole picture will be reduced in its size, it is sure to display a wide picture having an aspect ratio of 16:9 without missing any portions of the picture.

Further, according to NTSC standard system, one frame picture information is divided into two fields so as to be transmitted. On the television receiver side, the picture information of the two fields is scanned in an interlace scanning treatment so as to reproduce said one frame picture information. Such kind of principle is also suitable for use in transmitting a letter-box type picture. Namely, one frame picture information is divided into two fields so as to be transmitted. On the television receiver side, the picture information of the two fields is scanned in an interlaced scanning treatment so as to reproduce said one frame picture information, in a manner as shown in FIG. 8.

However, when the above interlace scanning is performed to reproduce picture information, since the scanning is carried out on every other line, a reproduced picture will become rough or some line flickerring phenomenon will occur, resulting in a low picture quality. In order to solve this problem, it has been suggested that on the television receiver side, an interpolation treatment be performed so that the interlace scanning treatment may be changed to a non-interlace scanning treatment (progressive scanning). One example of such non-interlace scanning treatment is called motion adaptive interpolation method.

According to the motion adaptive interpolation method, with respect to a still picture, an inter-field interpolation treatment is performed so that the picture information involved in two fields may be used to produce interpolation scanning signal. On the other hand, with respect to a moving picture, an in-field interpolation treatment is performed, so that scanning line information of mutually adjacent scanning lines may be used to produce interpolation scanning signal.

The above different kinds of interpolation treatments may be combined together and be properly changed over between each other in accordance with a moving amount of a picture, thereby ensuring a good picture quality for a reproduced picture.

However, when the motion adaptive interpolation method is used to process the letter-box type picture signal, moving picture and still picture will be undesirably mixed together in boundary portions L1, L2 between the main picture portion A and the non-picture portions B1, B2. As a result, although it is possible to perform the interpolation treatment on moving picture portions in the boundary portions L1, L2, it is impossible to perform the interpolation treatment on still picture portions. Consequently, the boundary portions L1, L2 will contain clearly visible portions on which the interpolation treatment has been performed and non-visible portions on which the interpolation treatment has not been performed, hence resulting in a low picture quality.

SUMMARY OF THE INVENTION

It is an object of the present invention to provide an improved method of processing picture signal, capable of ensuring a high picture quality by clearly displaying boundary portions between main picture portion and non-picture portions of a letter-box type picture, so as to solve the above-mentioned problems peculiar to the above-discussed prior arts.

According to the present invention, there is provided a picture signal processing method for processing a picture signal containing information including main picture Portion and non-picture portions, said method comprising: detecting boundary portions existing between the main picture portion and the non-picture portions of the picture signal; performing inter-field interpolation treatment to produce an interpolation scanning signal: and using the interpolation scanning signal to perform inter-field interpolation treatment on boundary portions between the main picture portion and the non-picture portions of the picture signal, so as to ensure a clearly visible display of the boundary portions.

In one aspect of the present invention, the boundary portions are detectable in accordance with an identification signal superimposed on the picture signal containing the information including the main picture portion and the non-picture portions.

The above objects and features of the present invention will become better understood from the following description with reference to the accompanying drawings.

DETAILED DESCRIPTION OF THE PREFERRED EMBODIMENTS

Figure 1:
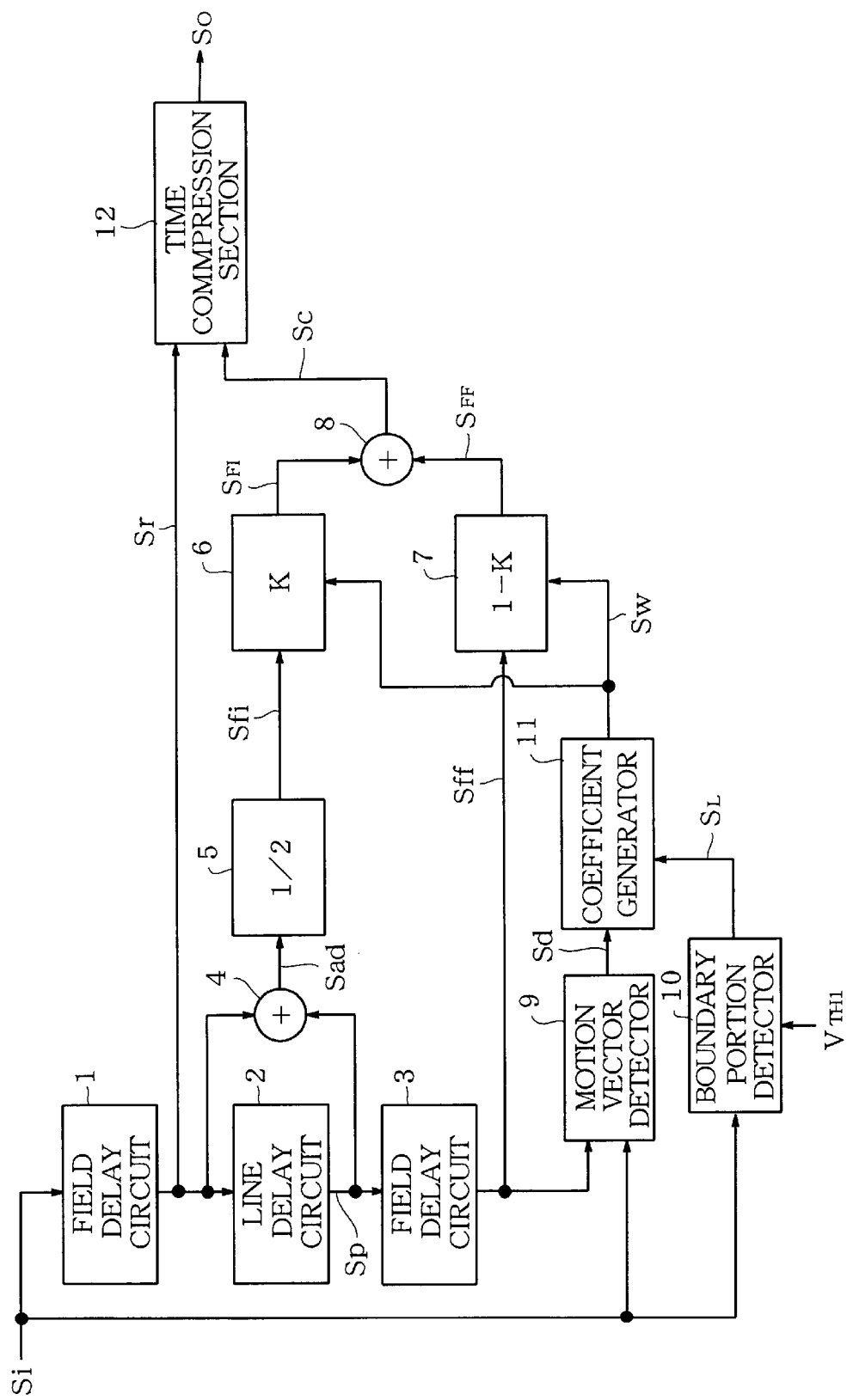
FIG. 1 is a block diagram indicating the constitution of a picture signal processing apparatus suitable for carrying out the picture signal processing method of the present invention.

FIG. 1 is a block diagram indicating the constitution of a picture signal processing apparatus suitable for carrying out the picture signal processing method of the present invention.

As shown in FIG. 1, the picture signal processing apparatus comprises a first field delay circuit 1, a line delay circuit 2, a second field delay circuit 3.

The first field delay circuit 1 contains a delay element such as a video signal memory which is adapted to receive an input Si that is a digital component signal (hereinafter referred to as picture signal) in a state of interlace scanning, supplied from a DVD (Digital Video Disk) reproducing device or a television tuner. The picture signal is delayed for one-field period before being outputted by virtue of the delay element (video signal memory).

The line delay circuit 2 also contains delay element such as a video signal memory which receives a picture signal Sr supplied from the first field delay circuit 1 and delays the picture signal for one horizontal period (1 H period) before the picture signal is outputted therefrom.

The second field delay circuit 3 contains a delay element such as a video signal memory which is adapted to receive a picture signal Sp supplied from the line delay circuit 2 and to delay the picture signal for one field period before the picture signal is outputted therefrom.

As shown in FIG. 1, the picture signal processing apparatus further comprises a first calculator 4 which can act as an adder for adding together the picture signals fed from the first field delay circuit 1 and the line delay circuit 2, an amplifier 5 for amplifying the added signal fed from the adder 4, a first adjusting circuit 6 for adjusting the amplified signal fed from the amplifier 5 so as to produce a signal SFI. The apparatus also contains a second adjusting circuit 7 for processing the picture signal Sff fed from the second field delay circuit 3 so as to produce a signal SFF.

Referring again to FIG. 1, the picture signal processing apparatus further includes a second calculator 8 which is an adder capable of adding together the signals SFI and SFF so as to produce an interpolation signal Sc, and a time compression section 12 capable of producing a picture signal So in a state of progressive scanning (non-interlace scanning), in accordance with the picture signal Sr fed from the first field delay circuit 1 and the interpolation signal Sc.

Moreover, the picture signal processing apparatus includes a motion vector detector 9 for discriminating a moving picture signal from a still picture signal in accordance with the above picture signal Si and a picture signal Sff fed from the second field delay circuit 3, a boundary portion detector 10 for detecting boundary portions between the main picture portion A and the non-picture portions B1, B2 when a letter-box type picture signal has been received, a coefficient generator 11 for controlling the first and second adjusting circuits 6 and 7, in accordance with detected signals from the motion vector detector 9 and the boundary portion detector 10.

As related in the above, the calculator 4 is used to add together the picture signals Sr, Sp fed from the first field delay circuit 1 and the line delay circuit 2, so as to produce an added signal Sad which is fed to the amplifier 5. The amplifier 5 is used to amplify the added signal Sad by one second of its original amplitude, so as to produce an in-field interpolation signal Sfi. The first adjusting circuit 6 includes a variable amplifier and an attenuator for variably adjusting an amplification factor K in accordance with a coefficient signal Sw fed from a coefficient generator 11. In this way, it is allowed to amplify the in-field interpolation signal Sfi by the amplification factor K, thereby producing a signal SFI. Here, the amplification factor K is set to be in a range of $0 \leq K \leq 1$.

The second adjusting circuit 7 is constituted in the similar structure as the first adjusting circuit 6, so that it can amplify the picture signal Sff, in accordance with an amplification factor 1-K set by a coefficient signal Sw fed from the coefficient generator 11, thereby producing a signal SFF. The amplification factor 1-K is also set to be in a range of $0 \leq 1-K \leq 1$. Since the amplification factor K of the first adjusting circuit 6 is allowed to change, the amplification factor 1-K is also in a changeable state.

The motion vector detector 9 contains a subtracter which is capable of calculating a difference between the amplitude of the picture signal Sff and that of the picture signal Si, so as to produce an amplitude difference signal Sd. In this way, the amplitude difference signal Sd can be outputted which indicates a variation of a moving picture information within a delay time set by the first and second field delay circuits 1, 3 and the line delay circuit 2.

The boundary portion detector 10 performs a comparison between the picture signal S1 and a threshold value VTH1 substantially equal to a black level. When the amplitude of the picture signal Si first becomes larger than the threshold value VTH1, it is allowed to determine that the picture signal represents a boundary portion L1 between the upper side non-picture portion B1 and the main picture portion A (see FIG. 7). On the other hand, when the amplitude of the picture signal Si later becomes smaller than the threshold value VTH1, it is allowed to determine that the picture signal represents a boundary portion L2 between the lower side non-picture portion B2 and the main picture portion A (see FIG. 7). At this moment, a determination signal SL is outputted indicating the positions of the boundary portions L1, L2 in terms of the number of horizontal scanning lines.

Figure 2:
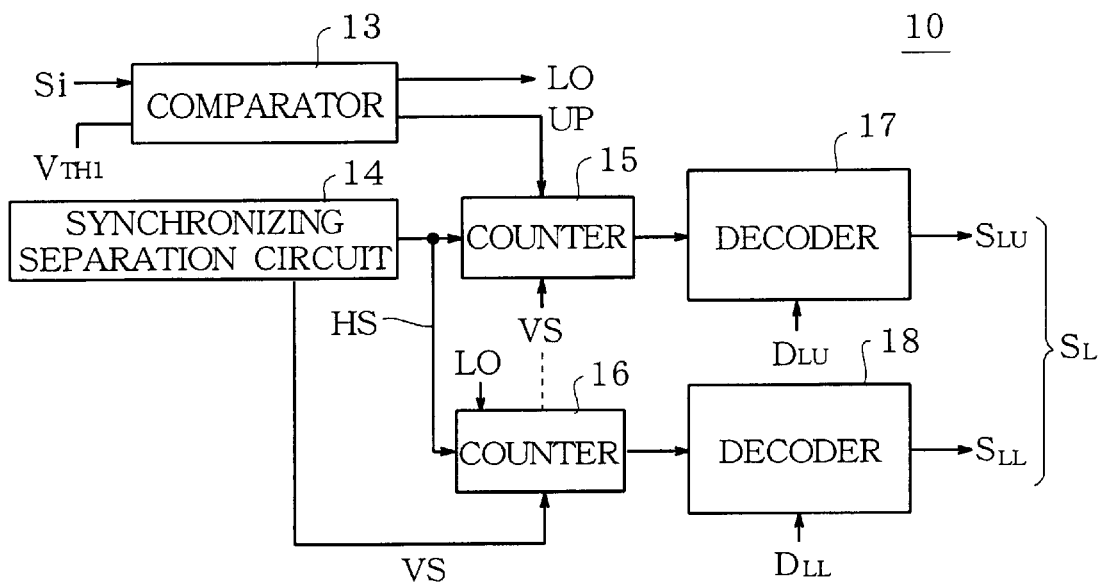
FIG. 2 is a block diagram indicating the constitution of a boundary portion detector.

FIG. 2 is a diagram indicating in more detail the boundary portion detector 10. As shown in FIG. 2, the boundary portion detector 10 includes a comparator 13 capable of effecting a comparison between the Picture signal Si and the threshold value VTH1, a synchronizing signal separation circuit 14 capable of producing vertical synchronizing signal VS and horizontal synchronizing signal HS, also includes counters 15 and 16, decoders 17 and 18.

Here, the comparator 13 is able to effect a comparison between the picture signal Si and the threshold value VTH1, and will produce a first detection signal UP when the amplitude of the picture signal Si becomes larger than the threshold value VTH1. Subsequently, the comparator 13 will produce a second detection signal LO when the amplitude of the picture signal Si becomes smaller than the threshold value VTH1.

The counter 15 is reset to be in synchronism with a vertical synchronizing signal VS, so as to start counting of the horizontal synchronizing signals and stop the counting once the first detection signal UP has occurred, with the counted value being fed to the decoder 17. Similarly, the counter 16 is also reset to be in synchronism with a vertical synchronizing signal VS, so as to start counting of the horizontal synchronizing signals and stop the counting once the second detection signal LO has occurred, with the counted value being fed to the decoder 18.

The decoder 17 is provided to decode the counted value fed from the counter 15, so as to produce a signal indicating the position of the upper side boundary portion L1 on a field picture, with the signal being a value SLU indicating the number of horizontal scanning lines. The decoder 18 is provided to decode the counted value fed from the counter 16, so as to produce a signal indicating the position of the lower side boundary portion L2 on a field picture, with the signal being a value SLL indicating the number of horizontal scanning lines.

Figure 3:
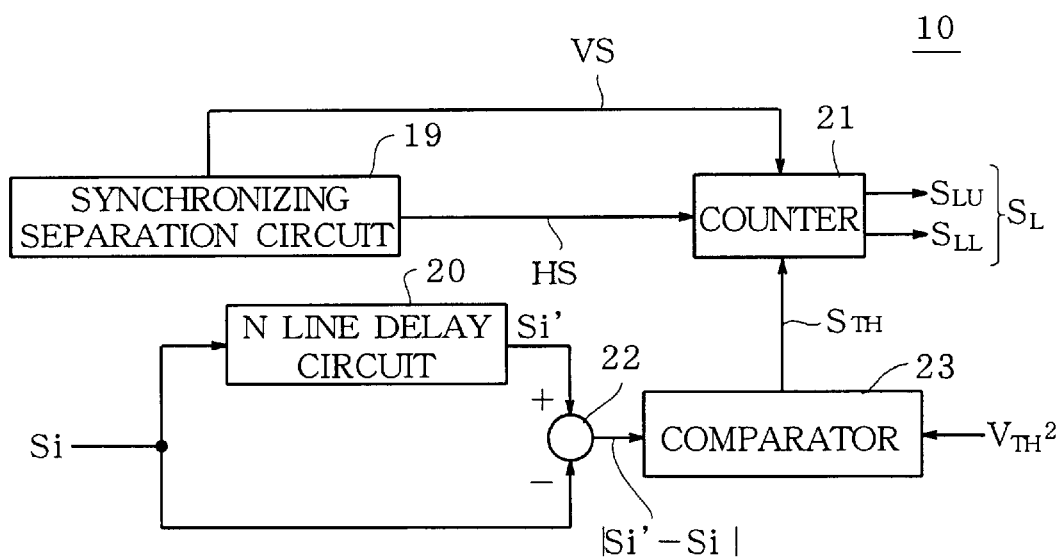
FIG. 3 is a block diagram indicating the constitution of another boundary portion detector.

Further, the boundary portion detector 10 may also be constituted in a manner shown in FIG. 3. As shown in FIG. 3, a modified boundary portion detector 10 includes a synchronizing signal separation circuit 19 capable of producing vertical synchronizing signal VS and horizontal synchronizing signal HS, a plurality of line delay circuits 20 each capable of delaying the picture signal Si by one horizontal scanning period, a counter 21, also includes a subtracter 22 and a comparator 23.

The subtracter 22 is used to calculate an absolute value $|Si'-Si|$ indicating a difference between a delayed picture signal Si' delayed in the line delay circuit 20 and a present picture signal Si. Comparator 23 is used to perform a comparison between the absolute value $|Si'-Si|$ and a predetermined threshold value VTH2, so as to produce a detection signal STH indicating a time point $t_{UP}$ at which $VTH2 < |Si'-Si|$, and than produce another detection signal STH indicating a time point $t_{LO}$ at which $VTH2 > |Si'-Si|$.

Figure 4:
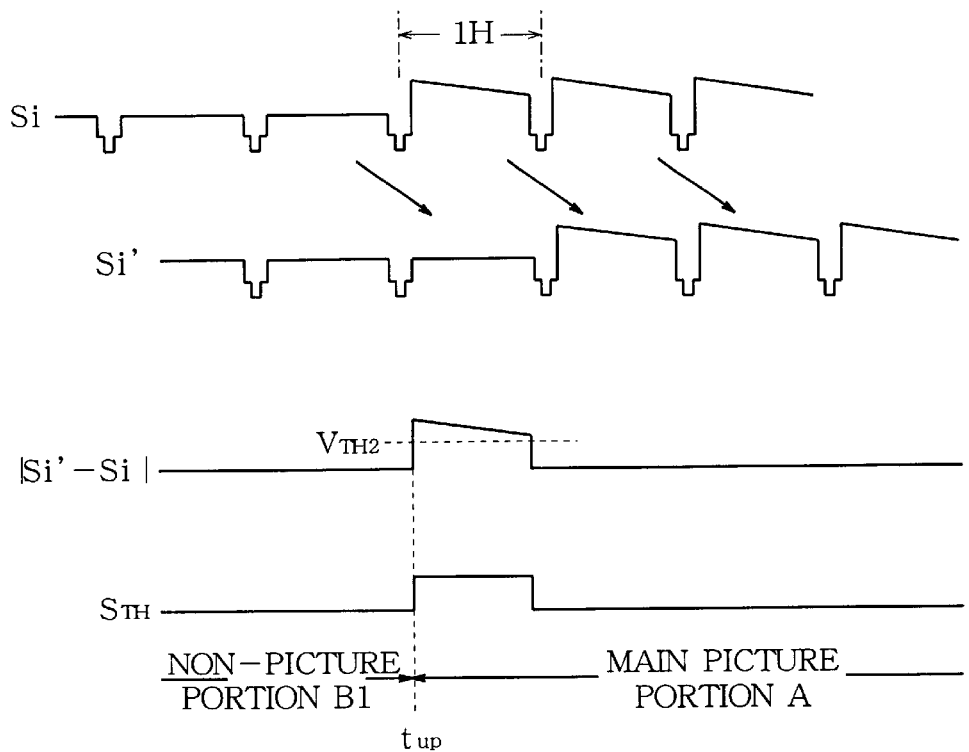
FIG. 4 is a waveform graph indicating an operation of a boundary portion detector.

In this way, when the line delay circuit 20 and the subtracter 22 and the comparator 23 are in operation, as shown in FIG. 4, the absolute value $|Si'-Si|$ will become exaggerated waveform in the boundary portions between the non-picture portions B1, B2 and the main picture portion A. By comparing the absolute value $|Si'-Si|$ with the threshold value VTH2, the upper boundary portion L1 and the lower boundary portion L2 may be detected at time points $t_{UP}$ and $t_{LO}$, thereby producing the detection signal STH.

The counter 21 is reset to be in synchronism with the vertical synchronizing signal VS, so as to start counting of the horizontal synchronizing signals HS, with the counting operation being continued until the time points $t_{UP}$ and $t_{LO}$ at which a detection signal STH has occurred. Then, a number counted until the time point $t_{UP}$ is defined as a value SLU indicating the number of horizontal scanning lines, for indicating the position of the upper boundary portion L1. At the same time, a number counted until the time point $t_{LO}$ is defined as a value SLL indicating the number of horizontal scanning lines, for indicating the position of the lower boundary portion L2. Both the values SLU and the values SLL are contained in a determination signal SL to be outputted from the counter 21.

Further, when the picture signal Si is supplied from the DVD reproducing device, since a recording medium DVD contains letter-box type picture information and identifying information representing the upper boundary portion L1 and the lower boundary port ion L2, it is allowed to set a determination signal SL indicating the boundary portions L1 and L2.

Figure 5:
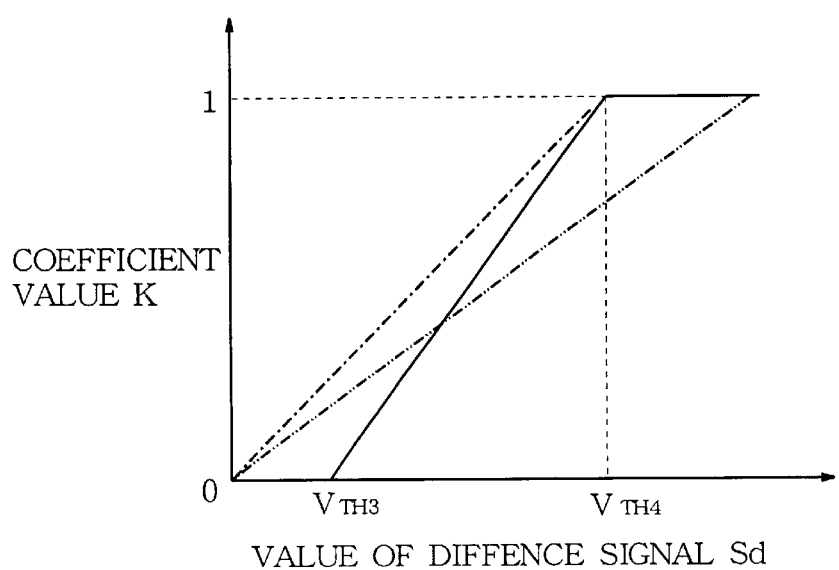
FIG. 5 is a characteristic graph indicating an operation principle of a coefficient generator.

The coefficient generator 11 is provided to generate a coefficient value K corresponding to the difference signal Sd fed from the motion vector detector 9, in accordance with a relationship represented by a solid line shown in FIG. 5. In this way, the amplification factors K and 1-K of the first and second adjusting circuits 6, 7 may be controlled by the coefficient signals sW fed from the coefficient generator 11. Namely, a threshold value VTH3 in FIG. 5 is set in order to remove noise components contained in the difference signal Sd, while a threshold value V TH4 in FIG. 5 is set in order to remove saturated areas contained in the difference signal Sd. When the difference signal Sd is smaller than the threshold value VTH3, K will become K=0. On the other hand, when the difference signal Sd is larger than the threshold value VTH4, K will become K=1. Finally, when the difference signal Sd is within a range between the threshold value VTH3 and the threshold value VTH4, the coefficient value K will become proportional to the difference signal Sd.

Further, the coefficient generator 11 is also allowed to set a coefficient value K in accordance with the determination signal SL. Namely, when the values SLU and the values S 1L are inputted by virtue of the determination signal SL, the coefficient value K may be forced to become K=0 at two time points when the boundary portions L1 and L2 have been detected.

In this way, when K=0, the amplification factor of the first adjusting circuit 6 will become [0], so that the signal SFi will become black level. Meanwhile, if K=0, the amplification factor of the second adjusting circuit 7 will become [1], so that the Picture signal Sff will be outputted as a signal SFF without being processed to any extent.

On the other hand, when K=1, the amplification factor of the first adjusting circuit 6 will become [1], so that the in-field interpolation signal SFi will become a signal SFI without being processed. Meanwhile, if K=1, the amplification factor of the second adjusting circuit 7 will become [0], the picture signal SFF will become black level.

Then, when 0<K<1, an in-field interpolation signal SFi and an inter-field signal Sff will be amplified by the amplification factors K and k-1, thereby producing signals SFI and SFF.

The second calculator 8 is provided to add together the signals SFI and SFF so as to produce an interpolation signal Sc. Here, since the picture signal Si is delayed by the first and second field delay circuits 1, 3 and the line delay circuit 2, an inter-field interpolation treatment has thus been completed, so that the picture signal Sff has become inter-field interpolation signal. Further, such inter-field interpolation signal is level-adjusted in the second adjusting circuit 7, so that the output signal SFF is a level-adjusted inter-field interpolation signal.

As a result, the interpolation scanning signal Sc wilt become field picture signal formed by the signal SFI treated by in-field interpolation treatment and the signal SFF treated by inter-field interpolation treatment. Further, through the level adjustment in accordance with the coefficient value K set by the coefficient generator 11, the non-picture portions B1, B2 and the boundary portions L1, L2 will be kept at the black level, while in the main picture portion, the interpolation scanning signal Sc will become a signal formed by mixing (adding) together the signal SFI and the signal SFF in accordance with the coefficient value K.

The time compression section 12 is provided to perform a time compression so that the field picture signal Sr and the interpolation scanning signal Sc are time-compressed to about one second (½) of one horizontal scanning period (1 H), thereby producing a progressive scanning (non-interlace scanning) type picture signal So by interpolation on every other line.

In this way, when the picture signal So is supplied to a display device such as a CRT display unit, even if a still picture and a moving picture are in the boundary portions L1, L2, since the boundary portions L1, L2 have a clearly visible black display, it is possible to reproduce a clearly visible letter-box type picture without any flickerring.

Figure 6:
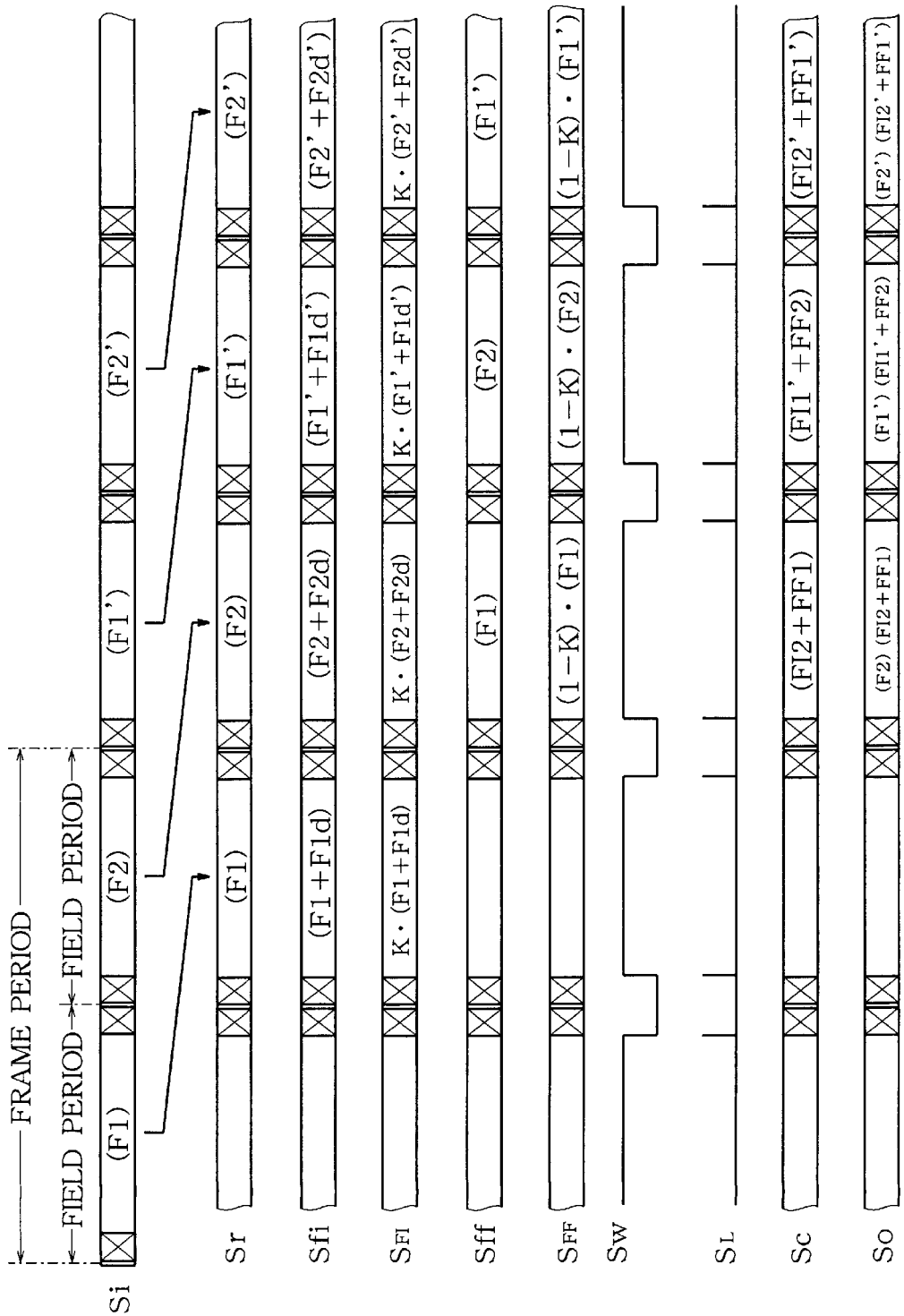
FIG. 6 is an explanatory view indicating the operation of the picture signal processing apparatus of the present invention.

A series of operations of the picture signal processing apparatus of FIG. 1 will be described in the following with reference to FIG. 6. In FIG. 6, marks [X] are used to represent non-picture portions, (F1), (F2), (F1'), (F2') are used to represent picture signals of main picture portions, F1d, F2d, F1d' and F2d' are used to represent picture signals of the main picture portion, which signals have been delayed for one field period.

Referring to FIG. 6, when a letter-box type picture signal Si is inputted, a picture signal Sr delayed by one field period is outputted from the first field delay circuit. The picture signal Sr is further delayed by one horizontal scanning period in the line delay circuit 2, thereby producing a picture signal Sp shown in FIG. 1. Then, the picture signal Sr and the picture signal Sp, with a title difference (one horizontal scanning period) therebetween, are passed through the calculator 4 and the amplifier 5, so as to produce an in-field interpolation signal SFi.

Then, a picture signal Sff, which has been delayed by two fields and one horizontal scanning period, is outputted from the second field delay circuit 3. In this way, the picture signal Sff will become inter-field interpolation signal treated by inter-field interpolation treatment. Further, in accordance with the picture signal Sff and the picture signal Si, the motion vector detector 9 produces a difference signal S d. The boundary portion detector 10 produces a determination signal SL. The coefficient generator 11, in accordance with the signals S d and SL, produces coefficient signal SW for setting coefficient value K.

In synchronism with the determination signal SL, an amplification factor K and an amplification factor 1-K of the first and second adjusting circuits 6 and 7 are set respectively, so that the in-field interpolation signal SFi and the inter-field interpolation signal Sff are adjusted in their levels, so as to produce a level-adjusted in-field interpolation signal SFI and a level-adjusted inter-field interpolation signal SFF, both of which are added together in the adder 8, thereby producing an interpolation scanning signal Sc.

Then, the interpolation scanning signal Sc and the picture signal Sr are fed to the time compression section 12, so as to produce the desired no-interlace picture signal So.

Figure 7:
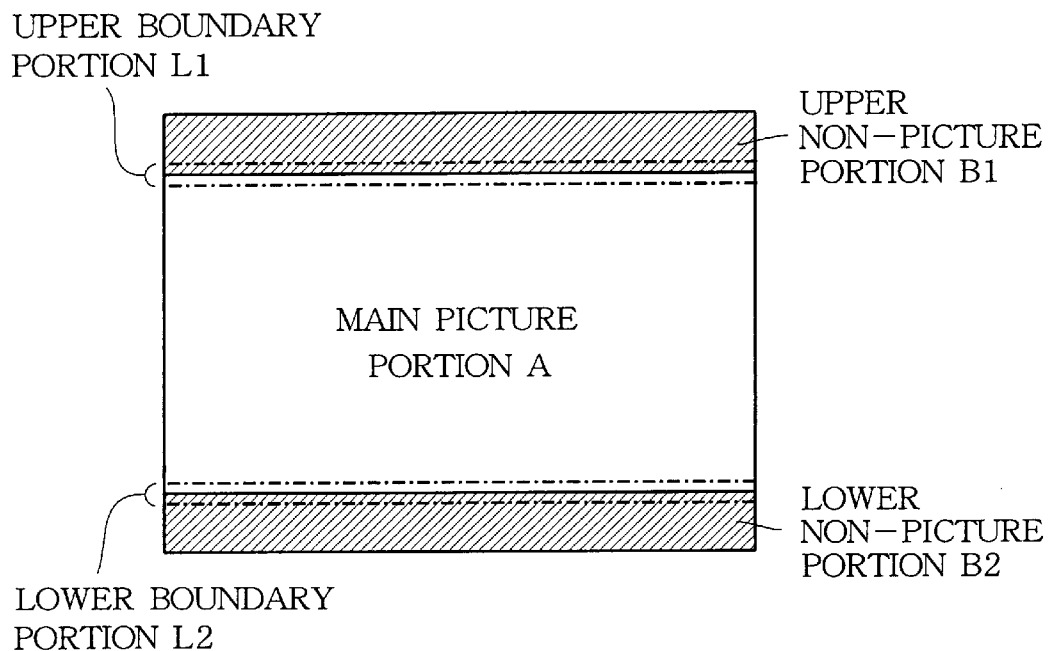
FIG. 7 is an explanatory view indicating an effect of the picture signal processing method according to the present invention.
Figure 8:
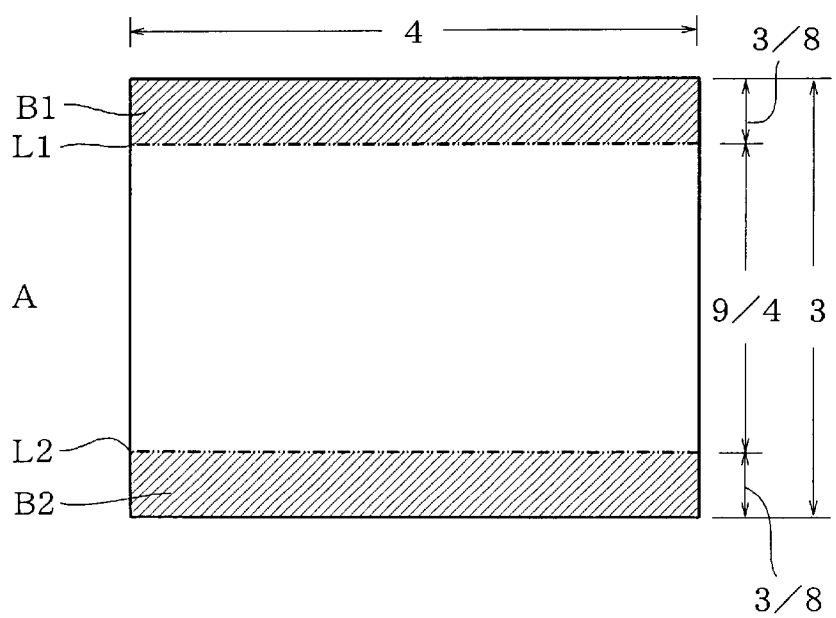
FIG. 8 is an explanatory view indicating the problem existing in a prior art.

In this way, with the use of the picture signal processing method and the picture signal processing apparatus of the present embodiment, it is possible to obtain an interpolation scanning signal Sc by virtue of the in-field interpolation signal SFI and the inter-field interpolation signal SFF. Therefor, as shown in FIG. 7, the non-picture portions B1, B2 and the boundary portions L1, L2 may be made black on the screen, so that there would be no flickerring phenomenon occurring on the boundary portions L1 and L2, even if moving picture and still picture are mixed together. Further, since the main picture portion A can produce a picture treated by in-field interpolation and inter-field interpolation, it is allowed to reproduce extremely clearly visible letter-box type picture.

By the way, a two-dot chain line and a one-dot chain line shown in FIG. 5 are used to indicate that it is also possible for the threshold value VTH3 to be omitted, so that a coefficient value K may be set from a time when the difference signal Sd is 0. In a case where the characteristic of the one-dot chain line is used, when a picture signal Si contains multiple information such as superimposed characters, such kind of information can be indicated on the non-picture portions B1, B2. At this time, since all the areas of the non-picture portions B1, B2 are made black except the superimposed characters, the whole quality of an entire picture can be prevented from getting deteriorated.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A picture signal processing method for processing a picture signal containing information including main picture portion and non-picture portions, said method comprising:

detecting boundary portions existing between the main picture portion and the non-picture portions of the picture signal;

performing inter-field interpolation treatment to produce an interpolation scanning signal; and using the interpolation scanning signal to perform inter-field interpolation treatment on boundary portions between the main picture portion and the non-picture portions of the picture signal, so as to ensure a clearly visible display of the boundary portions.

2. The picture signal processing method according to claim 1, wherein the boundary portions are detectable in accordance with an identification signal superimposed on the picture signal containing the information including the main picture portion and the non-picture portions.

* * * * *